(12) United States Patent
Volmering et al.

(10) Patent No.: US 12,420,236 B2
(45) Date of Patent: Sep. 23, 2025

(54) MEMBRANE FILTER AND FILTERING METHOD

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 0 days.

(21) Appl. No.: 18/382,514

(22) Filed: Oct. 22, 2023

(65) Prior Publication Data

US 2024/0123407 A1    Apr. 18, 2024

Related U.S. Application Data

(63) Continuation of application No. PCT/EP2022/058613, filed on Apr. 5, 2022.

(30) Foreign Application Priority Data

Apr. 22, 2021   (DE) .................. 10 2021 110 329.0

(51) Int. Cl.
*B01D 65/02* (2006.01)
*B01D 63/04* (2006.01)
(Continued)

(52) U.S. Cl.
CPC ............ *B01D 65/02* (2013.01); *B01D 63/04* (2013.01); *B01D 63/06* (2013.01); *C02F 3/1273* (2013.01);
(Continued)

(58) Field of Classification Search
CPC ........ B01D 65/02; B01D 63/04; B01D 63/06; B01D 2313/26; B01D 2315/06; B01D 2321/185; C02F 3/1273; C02F 3/208
See application file for complete search history.

(56) References Cited

U.S. PATENT DOCUMENTS 6,325,928 B1 * 12/2001 Pedersen ................ B01D 61/20
210/321.89
6,843,908 B2 * 1/2005 Okajima ................. B01F 23/29
210/201
(Continued)

FOREIGN PATENT DOCUMENTS

CN   104519984 B   6/2016
DE   19811945 A1   9/1999
(Continued)

*Primary Examiner* — Pranav N Patel
(74) *Attorney, Agent, or Firm* — Von Rohrscheidt Patents

(57) ABSTRACT

A membrane filter for submerged operation for filtering a liquid, comprising membrane elements and geyser elements for flushing the membrane elements in pulses using a gas, each membrane element having: hollow fiber membranes secured in a base element, each hollow fiber membrane having a lumen into which a liquid permeate is filterable out of the liquid, a permeate collection cavity connected to the lumens of the hollow fiber membranes for collecting the permeate from the hollow fiber membranes, a permeate outlet for discharging the permeate out of the permeate collection chamber, and a tubular housing enveloping the hollow fiber membranes of the membrane elements and penetrated by the permeate outlet, wherein the geyser elements are installed below the membrane elements, and each of the geyser elements having: a gas collection cavity and an outlet device for discharging the gas in pulses upwards out of the gas collection cavity.

11 Claims, 13 Drawing Sheets

(51) Int. Cl.
*B01D 63/06* (2006.01)
*C02F 3/12* (2023.01)
*C02F 3/20* (2023.01)

(52) U.S. Cl.
CPC .......... *C02F 3/208* (2013.01); *B01D 2313/26* (2013.01); *B01D 2315/06* (2013.01); *B01D 2321/185* (2013.01)

(56) References Cited

U.S. PATENT DOCUMENTS

| | | |
|---|---|---|
| 10,179,311 B2 | 1/2019 | Tanaka et al. |
| 2009/0194477 A1 | 8/2009 | Hashimoto |
| 2010/0300968 A1* | 12/2010 | Liu ..................... C02F 3/1273 |
| | | 210/138 |
| 2016/0030889 A1* | 2/2016 | Kim ........................ C02F 1/444 |
| | | 210/321.89 |
| 2017/0087518 A1* | 3/2017 | Volmering ............. B01D 61/18 |

FOREIGN PATENT DOCUMENTS

| | | |
|---|---|---|
| DE | 102013218188 B3 | 12/2014 |
| DE | 102019115265 A1 | 12/2020 |
| DE | 102019129074 B3 | 1/2021 |
| JP | H0667457 B2 | 8/1994 |
| KR | 20190002717 A | 12/2019 |
| WO | WO2011028341 A1 | 3/2011 |
| WO | WO2016064466 A1 | 4/2016 |

\* cited by examiner

MEMBRANE FILTER AND FILTERING METHOD

RELATED APPLICATIONS

This application is a continuation of International patent application PCT/EP2022/058913 filed on Apr. 5, 2022 claiming priority from German patent application DE 10 2021 110 329.0 filed on Apr. 22, 2021, both of which are incorporated in their entirety by this reference.

FIELD OF THE INVENTION

The invention relates to a membrane filter for submerged operation for filtering a liquid. The invention also relates to a method for filtering a liquid in a membrane filter.

BACKGROUND OF THE INVENTION

A generic membrane filter and a generic method are known from DE 10 2019 129 074 B3.

The known membrane filter and the known method are configured for filtering liquids with high solids content that can be found in membrane bioreactors (MBR) in biological waste water treatment plants. The tubular housing of each of the membrane elements forms a lateral boundary for the membranes and additionally has the advantage that gas introduced into a bottom of a membrane element cannot exit the membrane element laterally when flowing through the membrane element so that the gas is retained in the membrane element. This makes better use of a flushing effect of the gas. Air that is rapidly released in the geyser element rises quickly between the membranes due to buoyancy and pulls the liquid along in upward direction through a surface of the membrane filter that is open to the ambient and out of the membrane filter and thus cleans adhering contaminants from the membranes very effectively.

The known membrane filter however is limited in height and therefore quite often unable to utilize an available height of sludge pools in biological waste treatment plants where the membrane filter is submerged in the sludge pools. Additionally the energy requirement for providing air for flushing the membranes is one of the major economic aspects when operating membrane bioreactors so that reducing this energy requirement is very important.

WO 2016 064 466 A (Koch membrane systems) describes additional membrane filters and methods.

DE 10 2013 218 188 B3 describes a membrane bioreactor with a structured base element without geyser and US 2009/0194 477 A1 (Asahi Kasai), U.S. Pat. No. 10,179,311 B2 (Sumitomo Electric) CN 10 45 19 984 B (Samsung Cheil Industries), KR 2019 000 2717 A (Mitsubishi Chemical) and WO 2011/028341 A1 (Zenon Technology Partnership) respectively disclose membrane filters without a tubular housing about the membrane elements. DE 10 2019 115 265 A1 discloses a membrane element with a tubular housing.

DE 198 11 945 A1 and JP H06-67 457 B2 discloses membrane filters configured for dry operation including membrane elements arranged on top of one another in a closed tubular container wherein the liquid to be filtered and a flushing medium are fed to the container through tubular conduits and permeate and retain material are drained from the membrane filter through other tubular conduits. Operating geyser elements with their advantageous high flow velocities is not feasible in dry operation due to the limited cross sections of the draining conduits.

Additionally membrane bioreactors are known that include plural membrane elements including plate membranes arranged on top of one another, product line (SP series, Kubota, Japan), these, however, do not have geyser ventilation, require a large amount of energy for module ventilation and require a large amount of space due to their low packaging density.

BRIEF SUMMARY OF THE INVENTION

Thus it is an object of the invention to provide a membrane filter which effectively uses an introduced gas volume flow for flushing the hollow fiber membranes while having low complexity and a small insulation space requirement. Improving upon the known membrane filter the object is achieved by a membrane filter configured for submerged operation for filtering a liquid, the membrane filter comprising: membrane elements and geyser elements for pulsating flushing of the membrane elements with a gas, each of the membrane elements including: hollow fiber membranes fixed in a base element and respectively including a lumen so that a liquid permeate is filterable from the liquid into the lumen, a permeate collection cavity connected with the lumen of the hollow fiber membranes and configured to collect the permeate from the hollow fiber membranes, a permeate outlet configured to drain the permeate from the permeate collection cavity a tubular housing that envelops the hollow fiber membranes of the membrane element and that is penetrated by the permeate outlet, wherein the geyser elements are arranged below the membrane elements and each of the geyser elements includes: downward open gas collection cavity, and an outlet device configured to let the gas out from the gas collection cavity in upward direction in pulses; and the membrane filter further comprising: membrane units respectively including one of the geyser elements and plural of the membrane elements arranged above one another and above the one of the geyser elements.

This significantly reduces a number of geyser elements compared to the known membrane filter while keeping the number of the membrane elements the same in the membrane filter according to the invention. The number of geyser elements is cut in half when using two membrane elements in a membrane unit or reduced to a third when using three membrane elements per membrane unit. This significantly reduces complexity of the device.

The object is also achieved by a method for filtering a liquid in a membrane filter submerged in the liquid and including membrane elements and geyser elements, the method comprising: filtering a liquid permeate is in each of the membrane elements from the liquid into a lumen of hollow fiber membranes that are attached at a base element; collecting the liquid permeate from the lumen in a permeate collection cavity, wherein a tubular housing envelops the hollow fiber membranes of the membrane element; draining the permeate through the tubular housing from the permeate collection cavity; flushing the hollow fiber membranes by a gas, and continuously letting the gas into each of the geyser elements and letting the gas flow in pulses back out of the geyser element, by cyclically filling a gas volume arranged in a gas collection cavity of the geyser element, wherein the gas volume is defined in downward direction by a level of the liquid and simultaneously displacing the liquid top down from the gas collection cavity, and thereafter running the gas from the gas collection cavity upward out of the geyser element, while running the liquid into the gas collection cavity from below until an outflow of the gas stops, and wherein the gas flowing out in pulses flows from below into one of the membrane elements, wherein the gas flows through the membrane units in pulses, wherein one of the geyser elements is arranged in each of the membrane units respectively and plural membrane elements are arranged above one another above the one of the geyser elements.

This means that the gas flowing out of the geyser in the membrane filter according to the invention is not only run through one of the membrane elements, but through two or more membrane elements arranged on top of one another. This means air that is being introduced is used more effectively for flushing the membranes since the air flushes a much larger membrane surface.

An additional advantage of the membrane filter according to the invention is better space utilization of a pool depth that is provided in biological pools of waste water treatment plants by using membrane elements installed on top of one another in the membrane units.

The membrane filter according to the invention and the method according to the invention are configured for filtering liquids having a high solids content, that exist for example in membrane bioreactors (MBR). Thus, the membrane filters are submerged in the liquid to be filtered, in this case for example in the sludge of biological waste water treatment plants and cleaned water is pulled out of the membranes as permeate while solids retained by the membrane remain in the membrane filter and therefore have to be flushed out of the membrane filter. This is typically done by air that is introduced into the membrane elements from below.

Pulsing flushing of the membranes with gas counteracts a plugging of the membranes by filtered substances. Pulsing two phase flow including air and liquid to be filtered generated by the geyser element in the membrane element causes a high shear force and therefore causes effective flushing of the membranes.

The pulsing exit of the liquid creates higher shear forces than continuous gas application that is used for example in plate membranes and simultaneously a channel formation of the air is prevented. This means rising air bubbles always have to be formed anew and thus find new ways through the membrane filter over and over again.

The membrane filter can thus be configured with different types of membranes which are advantageously ultra or microfiltration membranes with pore sizes that are between 0.02 μm and 1.0 μm. However, also other membranes from the fields nano filtration or low-pressure reverse osmosis can be used.

The base element can have different shapes, e.g. with a circular or rectangular cross section. The base element can also be divided into a defined number of segments that are configured with the hollow fiber membranes. This configuration of the base element is described in the background of the invention, e.g. in DE 10 2013 218 188 B3. The segments of the base element are thus connected with one another through an anchor of the base element.

In a simple embodiment of the membrane filter according to the invention, two membrane elements are arranged on top of one another above a geyser element.

In another embodiment of the membrane filter according to the invention, each membrane element includes a top element in addition to the base element wherein the hollow fiber membranes are also attached on top in the top element. This type of membrane elements is also designated at "double header system." Thus, either only the base element or only the top element or both include a permeate collection cavity.

It is advantageous in a membrane filter according to the invention when the housing includes a laterally closed wall, this means no openings in the portion of the membranes. Only the permeate outlet is run through a lateral opening through the wall of the housing.

DE 10 2019 115 265 A1 discloses a membrane element with a tubular housing wherein the permeate outlet laterally penetrates the housing while the lower edge of the housing is arranged below the permeate outlet. As shown in DE 10 2019 115 265 A1, the opening in the wall of the housing through which the permeate outlet is run, can also extend to the lower edge of the housing.

In an advantageous embodiment of the membrane filter according to the invention the hollow fiber membranes are individually closed on top and thus float in the liquid freely since the membranes are only fixed in the base element with their lower ends glued into the base element with resin. Membrane elements of this type are also designated as single header systems, thus hair and fibrous compounds that are included in the liquid can be stripped off from the membrane element in upward direction and do not form accretions at a top in the membrane element. Simultaneously the housing laterally defines the membranes that are only fixed in the base element with their bottoms so that the membranes are supported in the membrane element. This means they are prevented from falling over and remain substantially vertically oriented.

In another embodiment of the membrane filter according to the invention the base element includes a tubular shell wherein the housing of the membrane element is made from the tubular shell and a tube that adjoins the tubular shell on top. This yields an engineering advantage when connecting and supporting the membrane element in the membrane filter since the supports of the membrane elements as well as the permeate outlet can be formed at the base element while the tubular portion of the housing that envelops the free membranes can be made from a simple tube that can be produced by extrusion. This tube can have circular, rectangular or alternatively also other random cross-sectional shapes. The shell of the base element is advantageously adapted to the cross-sectional shape of the tube, so that the shell and the tube can be connected in a simple manner to form the housing.

A similar configuration of the base element with a shell is also described in DE 10 2013 218 188 B3. Thus, the membranes are fixed in the membrane carrier of the base element which includes individual segments as recited supra. The shell and the membrane carrier of the base element are connected with one another by anchors of the base element wherein a flow cavity is created within the base element in a portion outside of the anchors between the shell and the membrane carrier, wherein the flow cavity is flowable by liquid and gas. This configuration of the base element explicitly forms part of the invention.

Another part of the invention is a membrane filter where each of the membrane units adjoins the housing of a lowest membrane element on top of the geyser element and the geyser element furthermore includes a flow channel configured to let the liquid into the lowest membrane element. This has the advantage that gas exiting the geyser element on top cannot escape laterally before entering the lowest membrane element, but is forced to flow through the lowest membrane element vertically upward. This assures that the entire gas flow flowing out of the geyser element can be used for flushing the membranes in the lowest membrane element.

In order to assure this flow pattern the housing does not have to seal tight at the geyser element but no purpose engineered gaps shall be provided between the geyser and the housing. Small leaks or gaps required for mounting the membrane units are tolerable, as long as they do not offer significant exit options for the gas and liquid volume flow.

A direct gap free connection of the lower membrane element on top of the geyser element has the advantage that the gas pulse exiting the geyser element on top exits into an almost closed space within the membrane element. This advantage is significant since the gas pulse entering this almost closed space of the membrane element initially displaces liquid included therein. The substantially lateral closure of this space has the consequence that the liquid can only be displaced vertically upward, this means through the membrane element along the hollow fiber membranes. This causes a quickly accelerating water flow through the membrane element before the first gas bubbles reach the hollow fiber membranes. This means the gas pulse exiting in the membrane element initially generates a vertically upward oriented liquid pulse in the membrane element, which significantly improves a flushing effect of the membranes and which causes additional energy savings. This effect is described in the background of the invention in another application by the inventor which is not published yet at the filing date of the instant application.

In another embodiment of the membrane filter according to the invention, three or more of the membrane elements are installed respectively on top of the geyser element in each of the membrane units. This has advantages in particular when more economical hollow fiber membranes with smaller inner diameters are used since these have greater flow resistances in the lumen and therefore higher pressure drop and therefore have to be configured shorter. In order to use the pool depth of existing biological pools in waste water treatment plants with membrane bioreactors (MBR) it can be advantageous to install more than two membrane elements within a membrane unit above a geyser element.

According to the invention, the housings of two membrane elements arranged on top of one another, adjoin in each of the membrane units. Similar to the direct connection of the geyser element at the housing of the lowest membrane element, also this configuration has the effect that the gas cannot escape from the membrane unit laterally, when transitioning from one membrane element into a membrane element arranged there above and thus the gas is retained in the membrane element. Furthermore the additional flushing effect recited supra is also utilized for the upper membrane elements by accelerating the water column in the membrane elements which contributes to a much more efficient utilization of the energy of the gas introduced for flushing the membranes.

In another embodiment of the membrane filter according to the invention, the membrane elements that are arranged below another membrane element in each of the membrane units include an intermediary dement respectively arranged on top at the housing wherein the intermediary element penetrates a bottom of a respective housing of a membrane dement arranged there above in order to provide elevation compensation for temperature induced expansion within the membrane unit. This provides a solution for a design inherent engineering challenge: the housings of the membrane filters are typically made from synthetic materials while the frames where the membrane units are installed are typically made from stainless steel. Since many synthetic materials have significantly different expansion properties over temperature compared to stainless steel, using different materials in the membrane filter can become a problem when the membrane units are attached at several vertically offset locations. The intermediary element of the membrane filter according to the invention which penetrates into a respective bottom of a housing of a membrane dement installed there above compensates different length expansion of the different materials since the intermediary elements penetrate more or less deep into the housing arranged there above. Thus, the advantages recited supra of directly adjoining the membrane dements in the vertical direction are maintained.

A gap in the radial direction between the housing and the intermediary element that is created when the intermediary element penetrates into the housing of the membrane element installed there above, should be kept as small as possible in order to efficiently retain the gas within the housing.

In a commercial configuration of the membrane filter according to the invention typically several of the membrane units are installed in a module frame adjacent to one another wherein the permeate outlets of membrane dements positioned at an identical elevation are respectively connected at a common permeate collecting conduit. Thus, the membrane filters can be configured with greater overall membrane surfaces. When connecting the membrane elements respectively positioned at an elevation at a joint permeate collecting conduit and fixing the collection conductors in a stainless-steel frame the intermediary dements described in the last paragraph are advantageous to assure different length compensation at higher temperature variations.

In another embodiment of the membrane filter according to the invention the outlet device of the geyser elements includes a gas lifting channel wherein the gas flows into the gas lifting channel downward from the gas collection cavity when a threshold level of the liquid is undercut in the gas collection cavity and the gas is deflected in upward direction at an elevation of the threshold level. This deflection is performed in a deflection portion that adjoins at a bottom of the gas lifting channel and in which gas is deflected from a downward flow into an upward flow. A gas flow out channel adjoins at a top of the deflection portion wherein gas flows in upward direction through the gas flow out channel out of the geyser element.

According to the invention each of the outlet devices includes a compensation inlet, including a compensation channel that adjoins the compensation inlet and leads into the deflection portion so that liquid is admitted into the deflection portion. A compensation inlet of this type has the advantage that the gas flow out from the geyser element stops reliably even at high gas feed volume flows after the gas collection cavity is substantially emptied so that the filling process can start anew. This assures a pulsing of the geyser element even at higher gas volume flows.

A geyser of this type with a compensation inlet is described in DE 10 2019 129 074 B3. Thus, the compensation inlet is arranged in the gas collection cavity. Therefore, the compensation inlet is arranged in the gas filled portion when the gas collection cavity is filled with gas which assures reliable starting of the geyser whereas the compensation inlet is arranged in a liquid filled portion when the gas collection cavity is purged from the gas, this means filled with liquid which assures a reliable stopping of the gas pulse. This configuration of the geyser element, forms part of the invention.

Improving upon the known method it is proposed according to the invention, that the gas flows through membrane units, where one of the geyser elements and there above plural of the membrane elements are installed so that the gas flows through a lower membrane element and subsequently enters into a membrane element installed there above, and flows through that membrane element. This uses gas exiting the geyser more effectively for flushing the membranes.

BRIEF DESCRIPTION OF THE DRAWINGS

The invention is subsequently described based on embodiments with reference to drawing figures, wherein.

DETAILED DESCRIPTION OF THE INVENTION

Figure 1A:
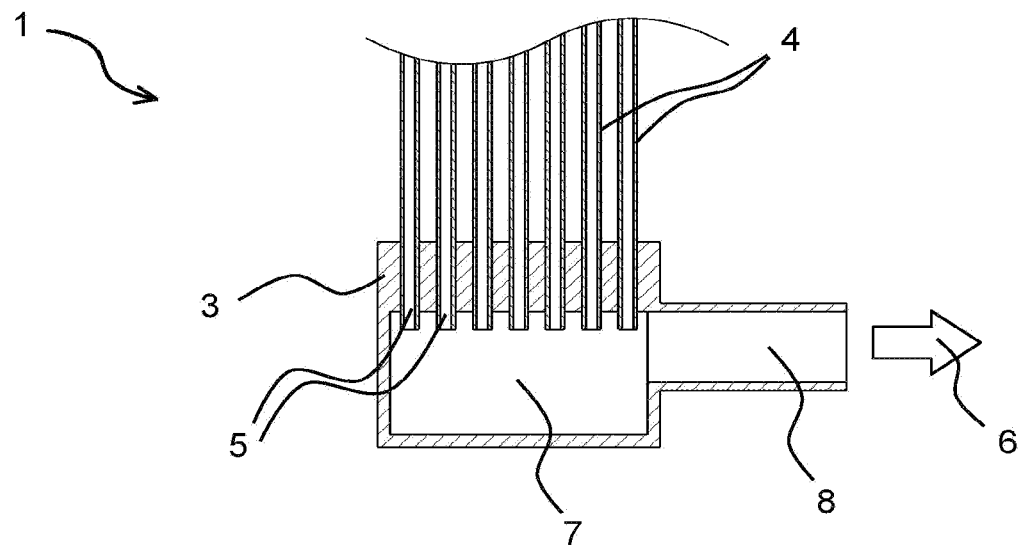
FIGS. 1A, 1B, 1C illustrate sectional views of a first membrane filter according to the invention.

The drawing figures are not to scale. All details of the subsequently described membrane filters or methods are identical to features of prior described membrane filters or methods.

FIG. 1A illustrates a partial sectional view of a lower portion of a membrane element 1 of a membrane filter 2 according to the invention for filtering a liquid in submerged operation showing a base element 3 where hollow fiber membranes 4 are attached at a lumen 5 into which a liquid permeate 6 is filterable. The upper portion of the hollow fiber membranes 4 is not shown. The base element 3 includes a permeate collection cavity 7 that is connected with the lumen 5 of the hollow fiber membranes 4 and configured to collect the permeate 6 from the hollow fiber membranes 4. Additionally, the membrane element 1 includes a permeate outlet 8 configured to drain the permeate 6 from the permeate collection cavity 7.

Figure 1B:
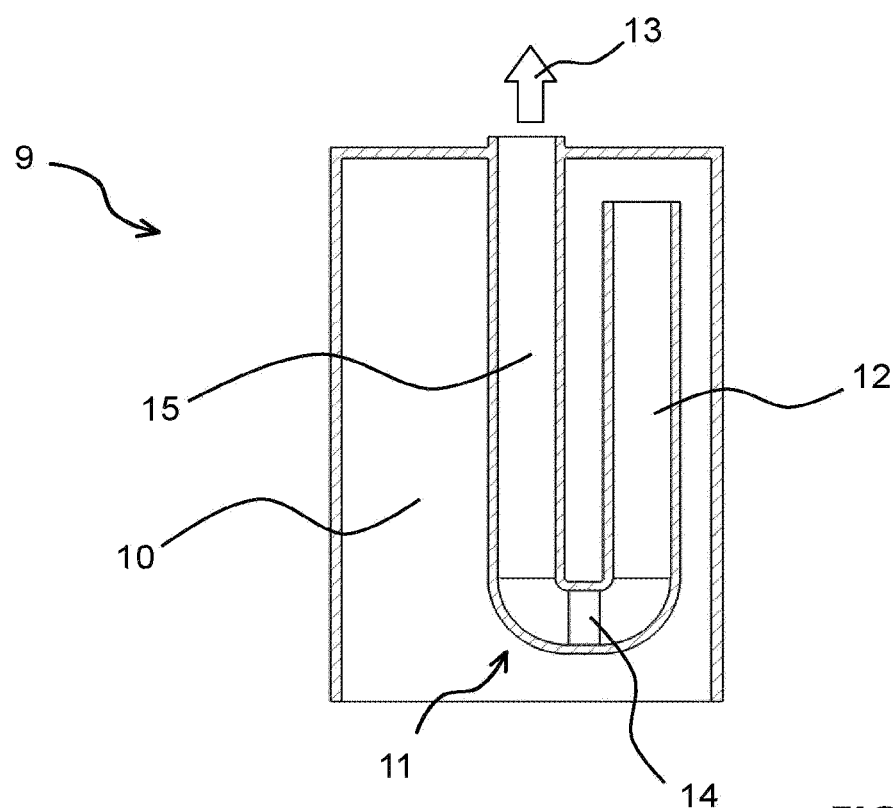

FIG. 1B shows a sectional view through a geyser element 9 of the membrane filter 2 according to the invention including a downward open gas collection cavity 10 and an outlet 11 including a syphon channel 12 configured to run a gas 13 from the gas collection cavity 10 downward and a deflection portion 14 arranged at a bottom of the gas lifting channel 12 configured to deflect the outflowing gas 13 upward. A gas flow out channel 15 connects at a top of the deflection portion 14, and is configured to let the gas flow out of the geyser element 9 in upward direction.

When undercutting a threshold level of the liquid in the gas collection cavity 10, the gas flows downward from the gas collection cavity and is deflected upward at the threshold level and subsequently flows through the gas flow out channel 15 from the geyser element 9. Thus, the threshold level is within the deflection portion 14.

Figure 1C:
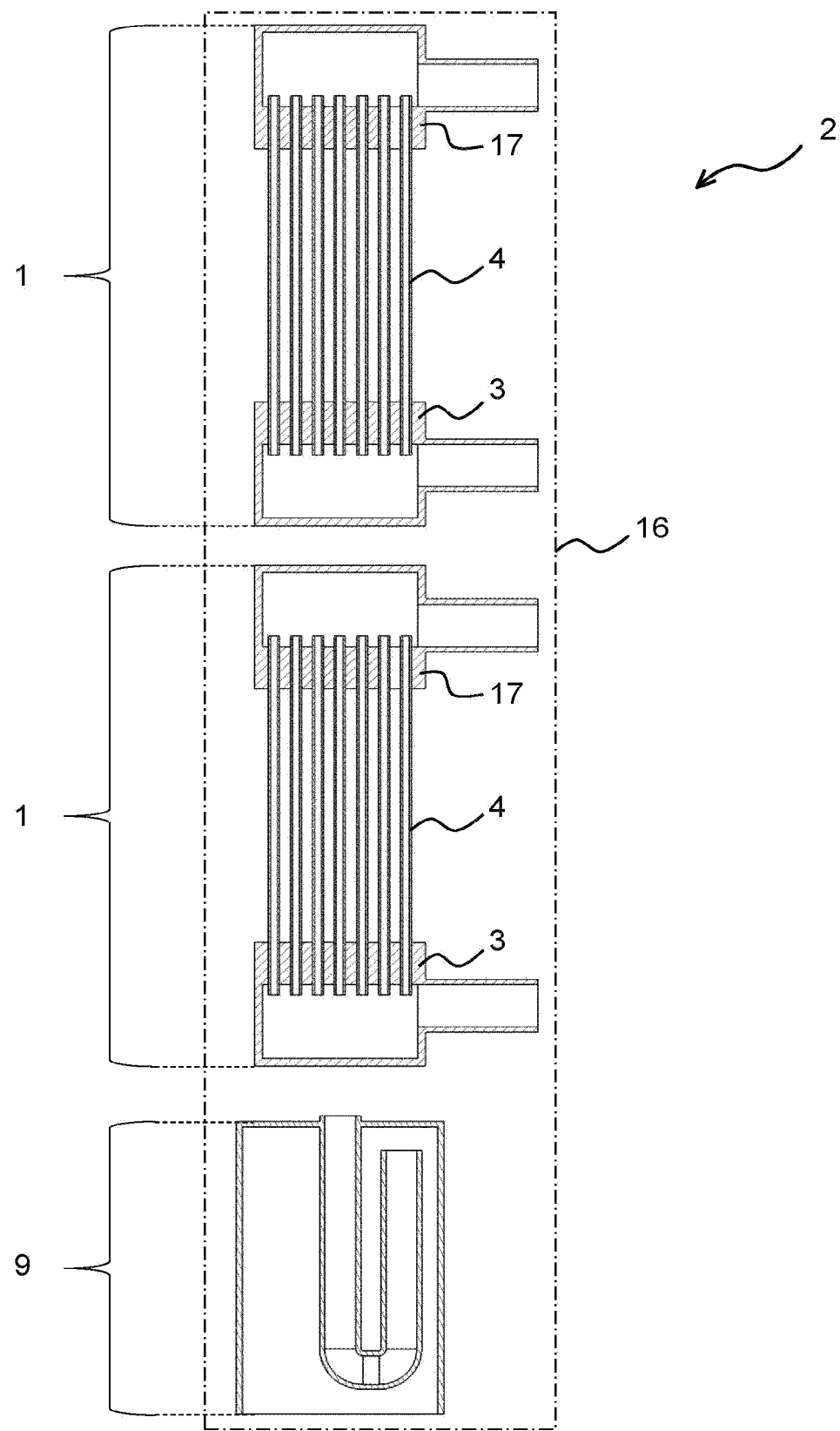

FIG. 1C shows a sectional view of a membrane unit 16 of the membrane filter 2 according to the invention. This membrane unit 16 shows one of the geyser elements 9 and two of the membrane elements 1 arranged there above. Each of the membrane elements 1 includes a base element 3 and a top element 17 where the hollow fiber membranes 4 are attached on top and below (double header membrane elements). The lower membrane element of the two membrane elements 1 is vertically offset from the geyser element 9 arranged thereunder and from the membrane element 1 arranged there above.

Figure 2A:
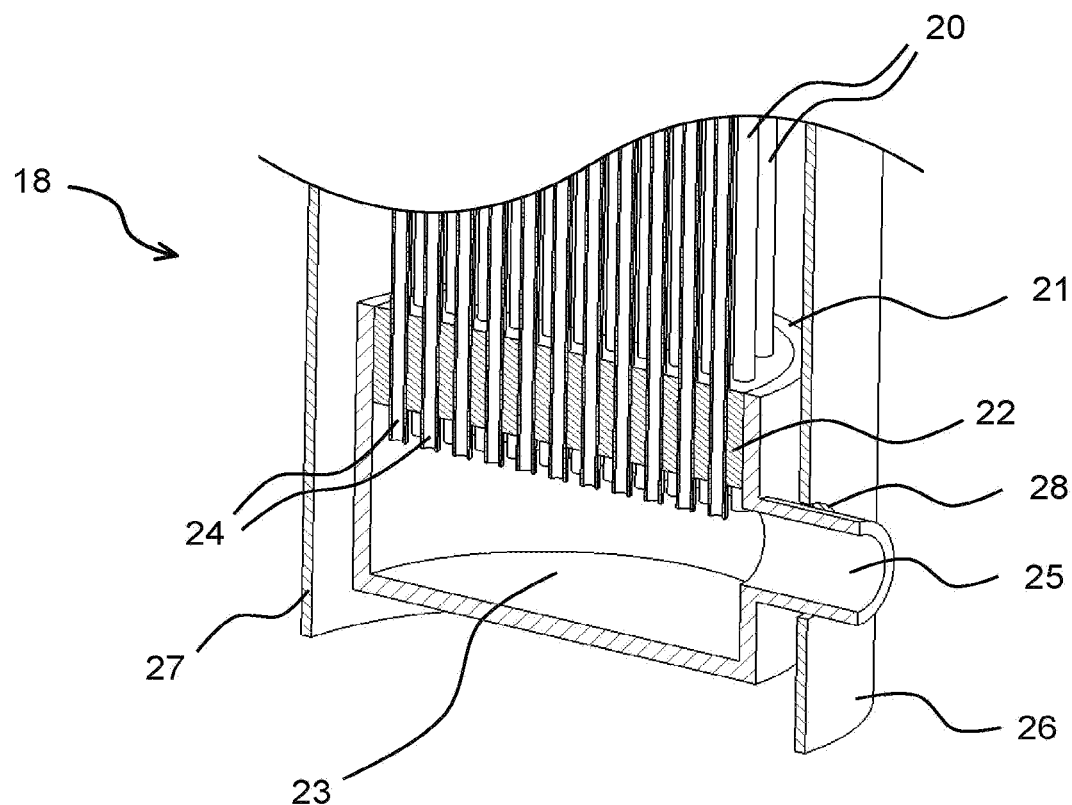
FIGS. 2A, 2B, 2C illustrate sectional views and details of a second membrane filter according to the invention.

FIG. 2A shows a detail sectional view of a membrane element 18 of a second membrane filter 19 according to the invention including hollow fiber membranes 20 attached in a base element 21. The attachment is performed by a resin layer 22 in which the hollow fiber membranes 20 are embedded and encased in a base element 21. The base element 21 includes a permeate collection cavity 23 connected with the lumen 24 of the hollow fiber membranes 20 and a permeate outlet 25. Additionally, the membrane element 18 includes a tubular housing that envelops the hollow fiber membranes 20 of the membrane element 18 and whose lateral wall 27 is penetrated by the permeate outlet 25. In this case the permeate outlet 25 laterally penetrates the housing 26 through an opening 28 in the housing 26.

Figure 2B:
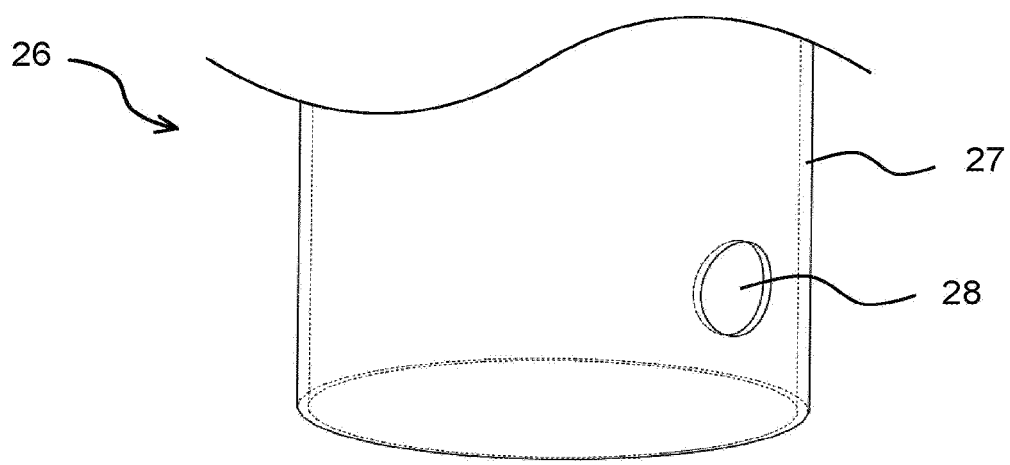

FIG. 2B shows the tubular housing 26 of the membrane element 18 of the second membrane filter 19 according to the invention. The housing 26 envelops the hollow fiber membranes 20 and the base element 21 of the membrane element 18. FIG. 2B also shows the lateral opening 28 in the housing 26 through which the permeate outlet 25 is run.

Figure 2C:
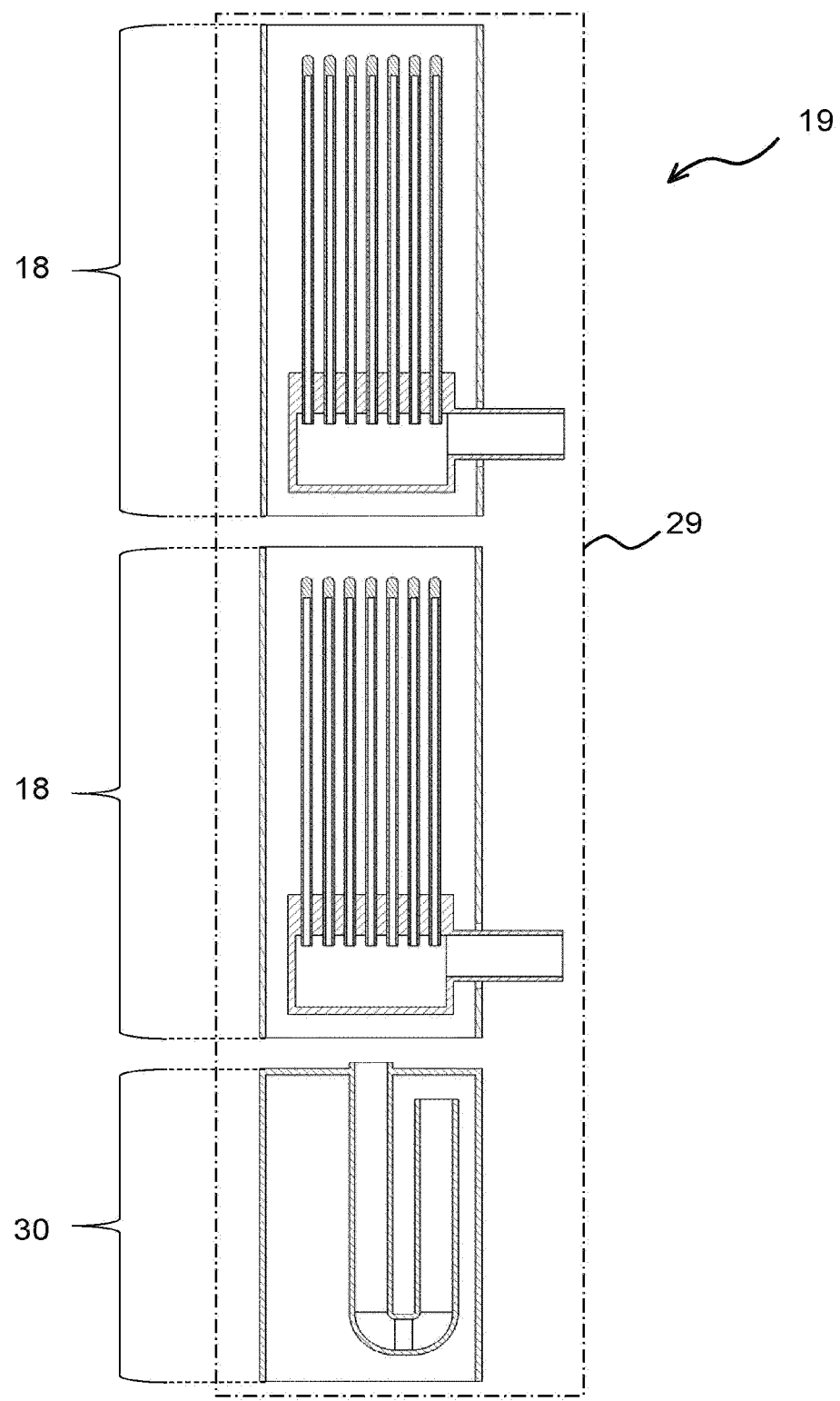

FIG. 2C shows a sectional view of a membrane unit 29 of the membrane filter 19 according to the invention. The membrane unit 29 includes a geyser element 30 and two of the membrane elements 18 installed there above. The hollow fiber membranes 20 in the membrane element 18 are individually closed on top so that they can float freely in the liquid to be filtered. This has the advantage that hair and fibrous compounds included in the liquid can be stripped off freely in upward direction during operation of the membrane filter 19 and do not lodge in the membrane filter 19 between the hollow fiber membranes 20.

Figure 3A:
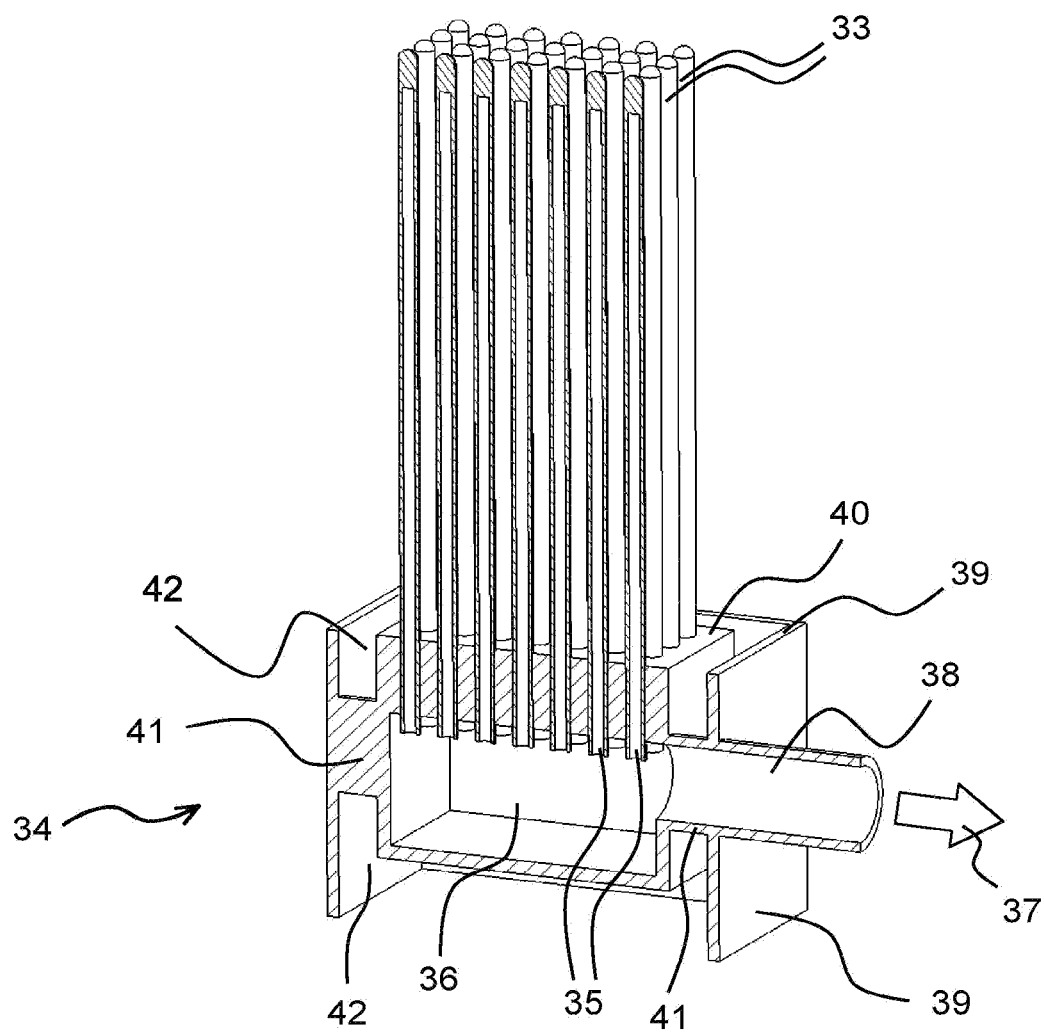
FIGS. 3A, 3B, 3C 3D, 3E illustrate sectional views and details of a third membrane filter according to the invention.

FIG. 3A shows a sectional view through a portion of a membrane element 31 of a third membrane filter 32 according to the invention with hollow fiber membranes 33 individually closed on top and freely movable and attached in a base element 32 at a bottom where they connect with their lumen 35 at a permeate collection cavity 36 configured to collect a permeate 37 from the hollow fiber membranes. The permeate 37 can be drained through a permeate outlet 38 from the membrane element 31. The base element 34 respectively includes a tubular shell 39 with a rectangular cross section and a membrane carrier 40 where the hollow fiber membranes are attached.

The shell 39 and the membrane carrier 40 are connected with one another through anchors 41 of the base element 34 wherein the permeate outlet 38 runs as an extension of one of the anchors 41 or through one of the anchors 41. An annular gap 42 is created between the shell 39 and the membrane carrier 40 and is flowable by liquid and gas and only interrupted by the anchors 41.

Figure 3B:
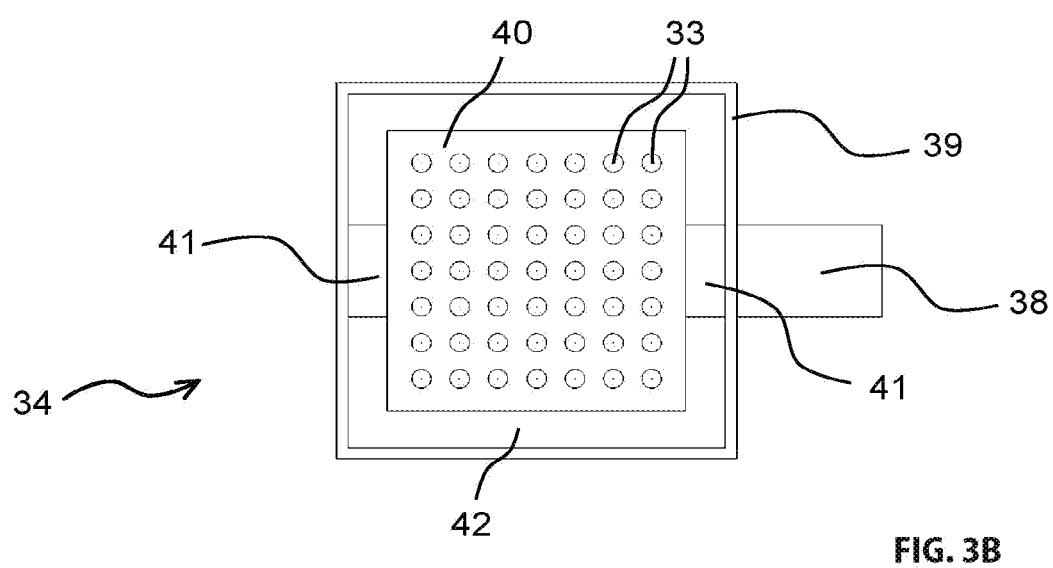

FIG. 3B shows a top view of a portion of the membrane element 31 of FIG. 4a. Thus, the membrane carrier 40, the shell 39 and the anchor 41 are shown, all of which are part of the base element 34. FIG. 3B also shows the annular gap between the shell 39 and the membrane carrier 40 which is only interrupted by the anchors 41 wherein one of the anchors runs in extension of the permeate outlet 38.

Figure 3C:
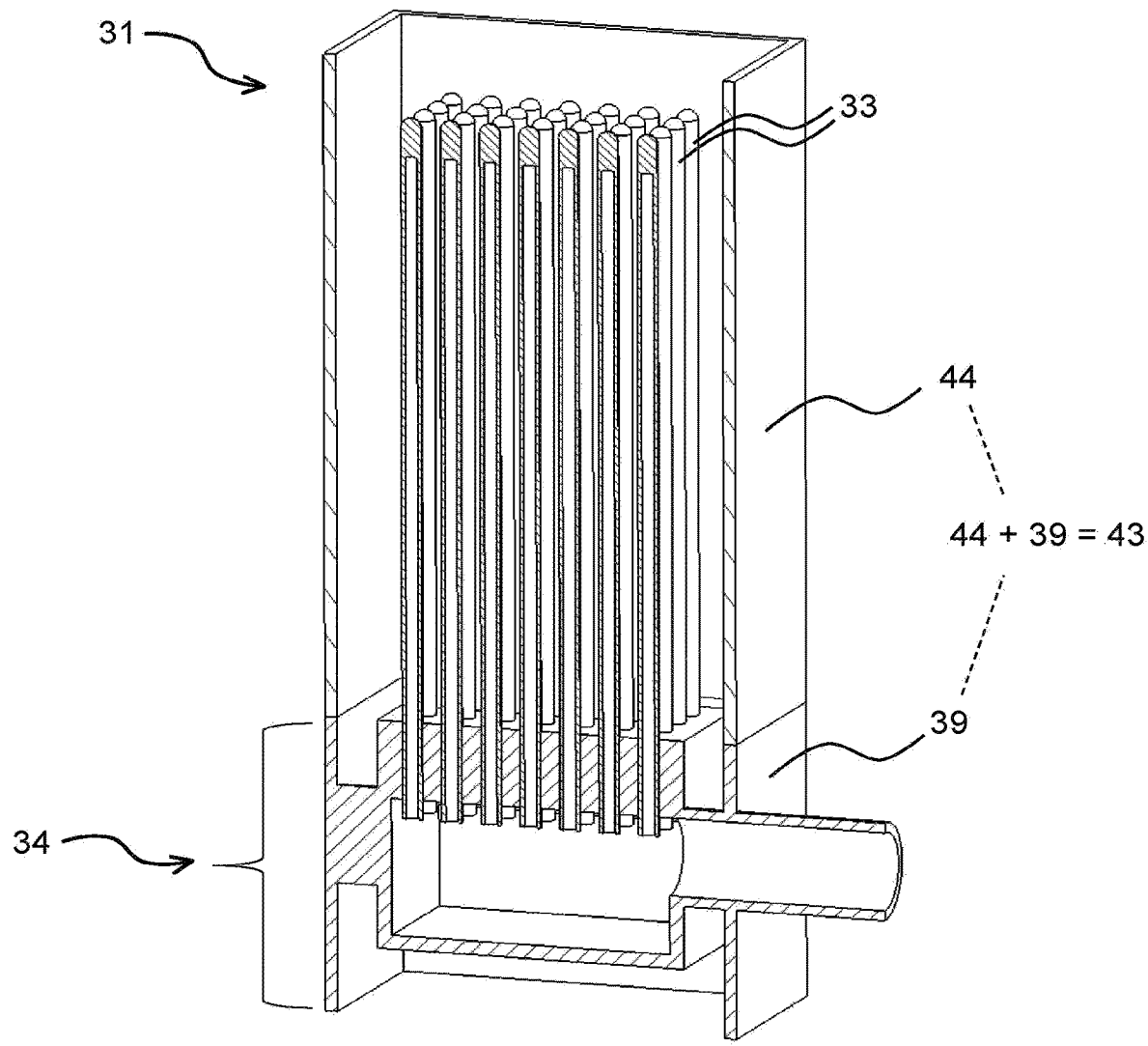

FIG. 3C shows a sectional view of the complete membrane element 31. The membrane element 31 includes a housing 43 that is made from the shell 39 of the base element 34, and a rectangular tube 44 that adjoins the shell 39 on top. The housing 43 envelops the hollow fiber membranes 33 of the membrane element 31.

Figure 3D:
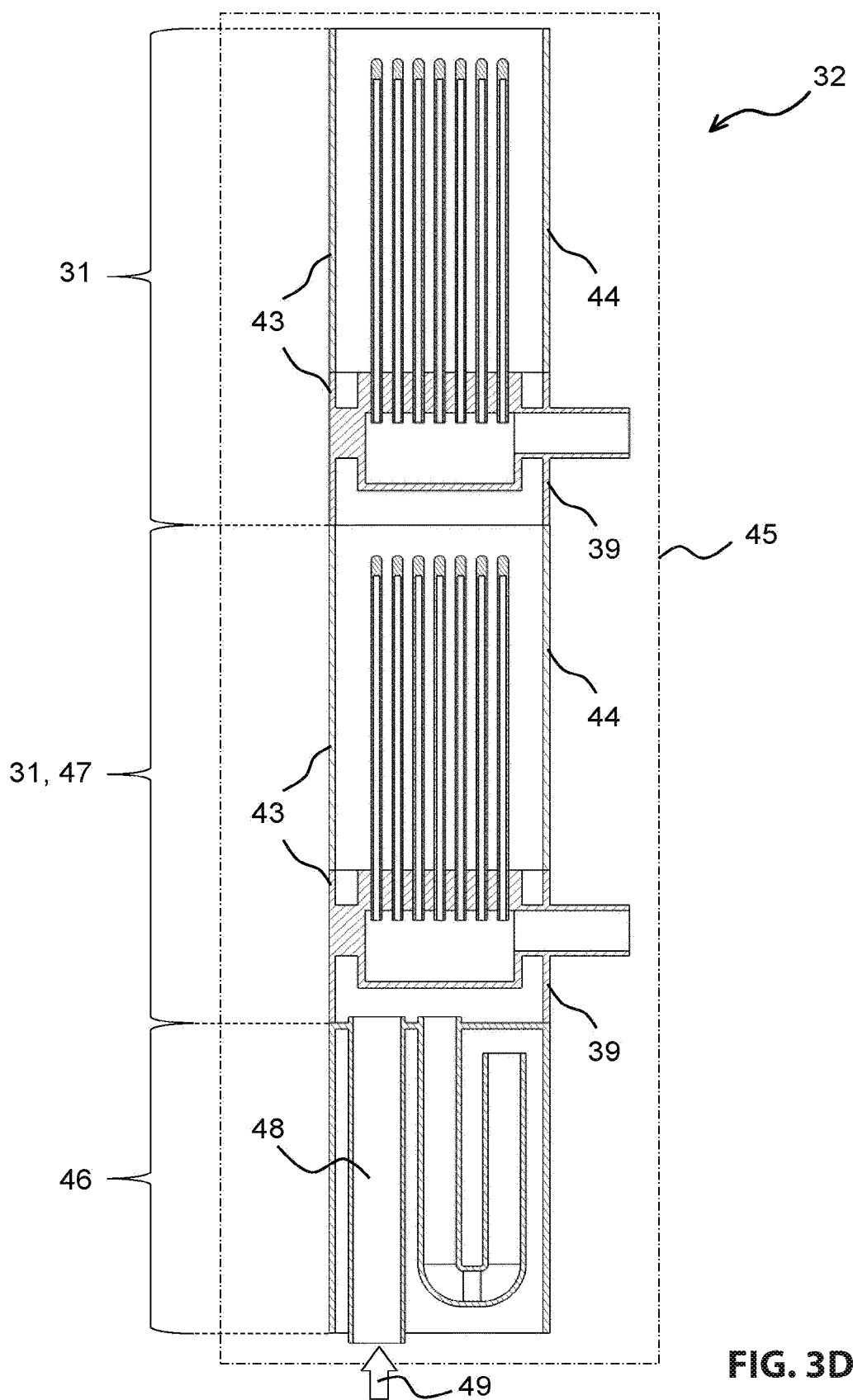

FIG. 3D shows a sectional view through a membrane unit 45 of the membrane filter 32. The membrane unit 45 includes two membrane elements 31 arranged on top of one another above a geyser element 46, wherein the housing 43 of a lowest membrane element 47 adjoins the geyser element 46 on top. Additionally, the geyser element 46 includes a flow channel 48 for letting fluid 49 into the lowest membrane element 47. The flow channel 48 penetrates the geyser element 46 in vertical direction. Additionally, the housings 43 of the two membrane elements 31 arranged on top of one another are joined together in the membrane unit 45.

Figure 3E:
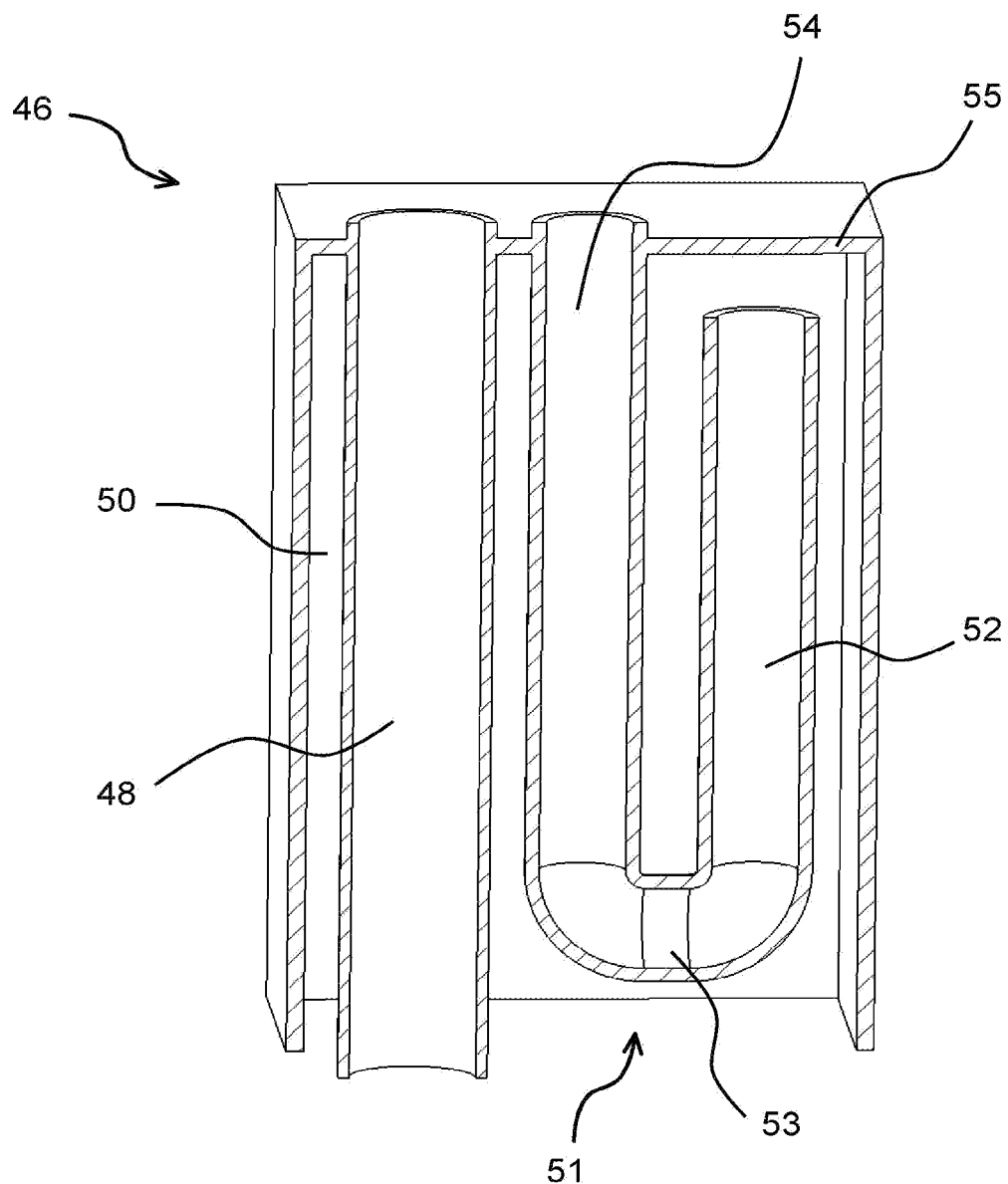

FIG. 3E shows a sectional view of the geyser element 46. The geyser element 46 includes a downward open gas collection cavity 50 in addition to the flow channel 48, and an outlet device 51. The outlet device 51 includes a gas lifting channel 52 in the gas collection cavity 50, a deflection portion 53 at a bottom of the gas lifting channel 52 and a gas flow out channel 54, which adjoins the deflection portion 53 on top and which terminates openly above the gas collection cavity 50. The flow channel 48 runs parallel to the gas flow out channel 54 and starts below the gas collection cavity 50 and terminates above the gas collection cavity 50. Thus, the gas collection cavity 50 is defined in upward direction by an upper wall 55 of the geyser element 46 and defined in downward direction by the deflection portion 53 since the deflection portion 53 limits a maximum filling level of the geyser element 46 with gas.

Figure 4:
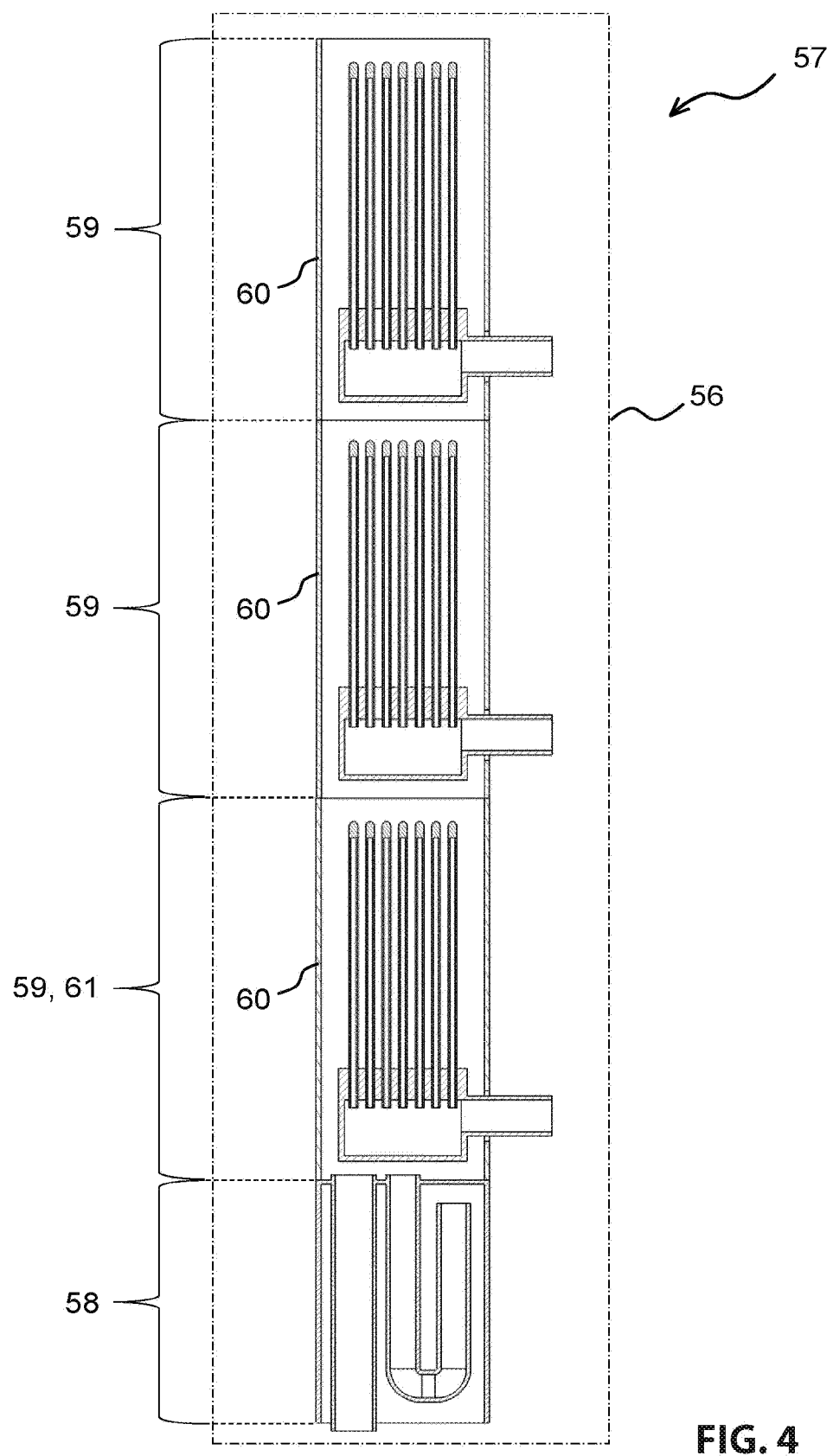
FIG. 4 illustrates a sectional view and details of a fourth membrane filter according to the invention.

FIG. 4 shows a sectional view through a membrane unit 56 of a fourth membrane filter 57 according to the invention, including a geyser element 58 and three membrane elements 59 installed on top of one another there above. The membrane elements 59 are identical with the membrane elements 16 of the second membrane filter 17. Thus, two housings 60 of two membrane elements 59 arranged on top of one another, are joined in the membrane unit 56. Additionally, the housing 60 of the lowest membrane element 61 adjoins the geyser element 58.

Figure 5A:
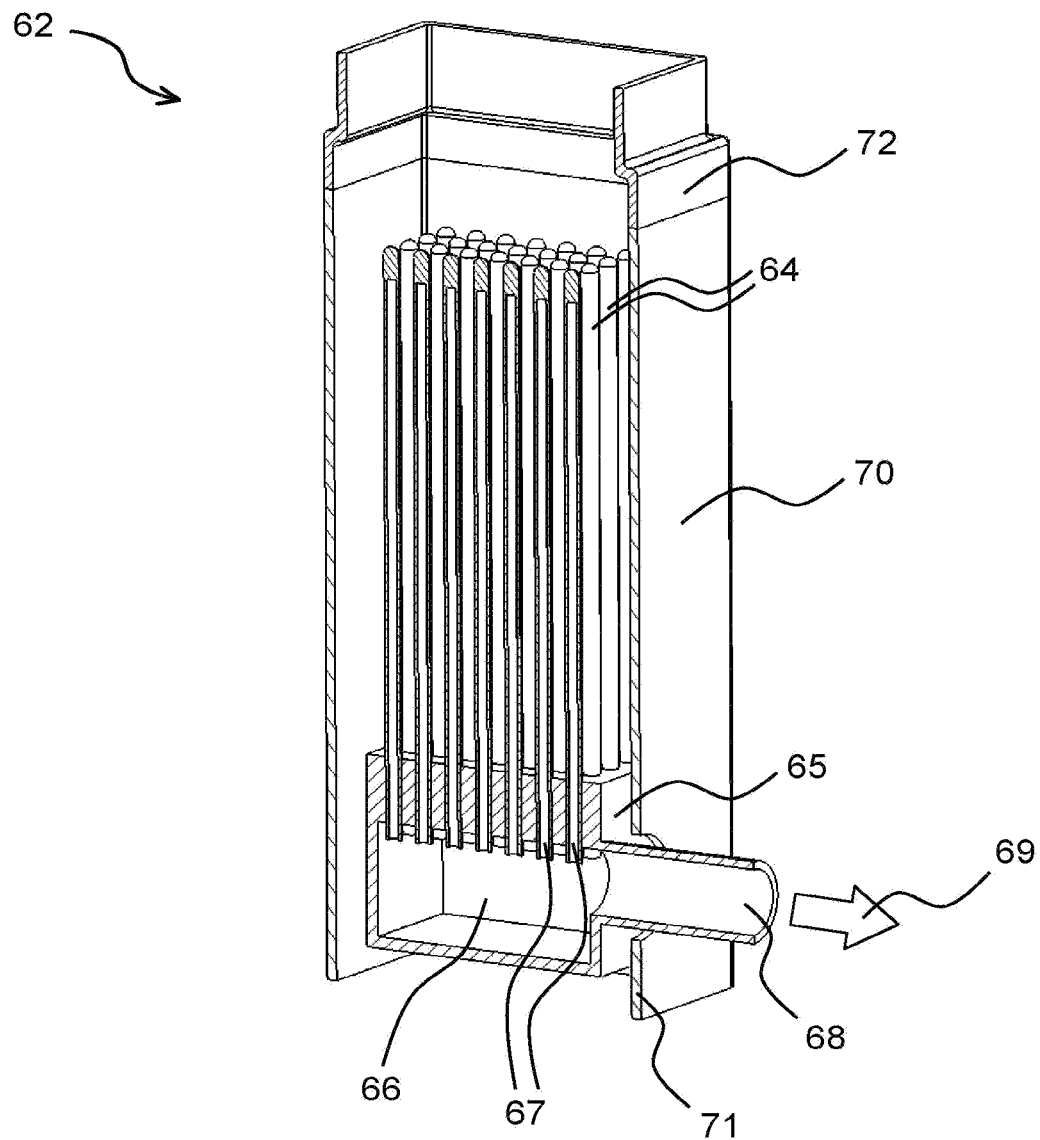
FIGS. 5A, 5B, 5C illustrate sectional views and details of a fifth membrane filter according to the invention.

FIG. 5A shows a sectional view through a membrane element 62 of a fifth membrane filter 63 according to the invention including hollow fiber membranes 64 attached in a base element 65. The base element 65 includes a permeate collection cavity 66 connected with lumen 67 of the hollow fiber membranes 64. The base element 65 additionally includes a permeate outlet 68 configured to let permeate 69 out of the permeate collection cavity 66. The membrane element 62 also includes a housing 70 that envelops the hollow fiber membrane 64, wherein a lateral wall 71 of the housing 70 is penetrated by the permeate outlet 68. The membrane element 62 includes an intermediary element 72 at a top of the housing 70 wherein the intermediary element is configured to adjoin the housing 70 on top and penetrate from below into the housing 70 of a membrane element 62 arranged there above.

Figure 5B:
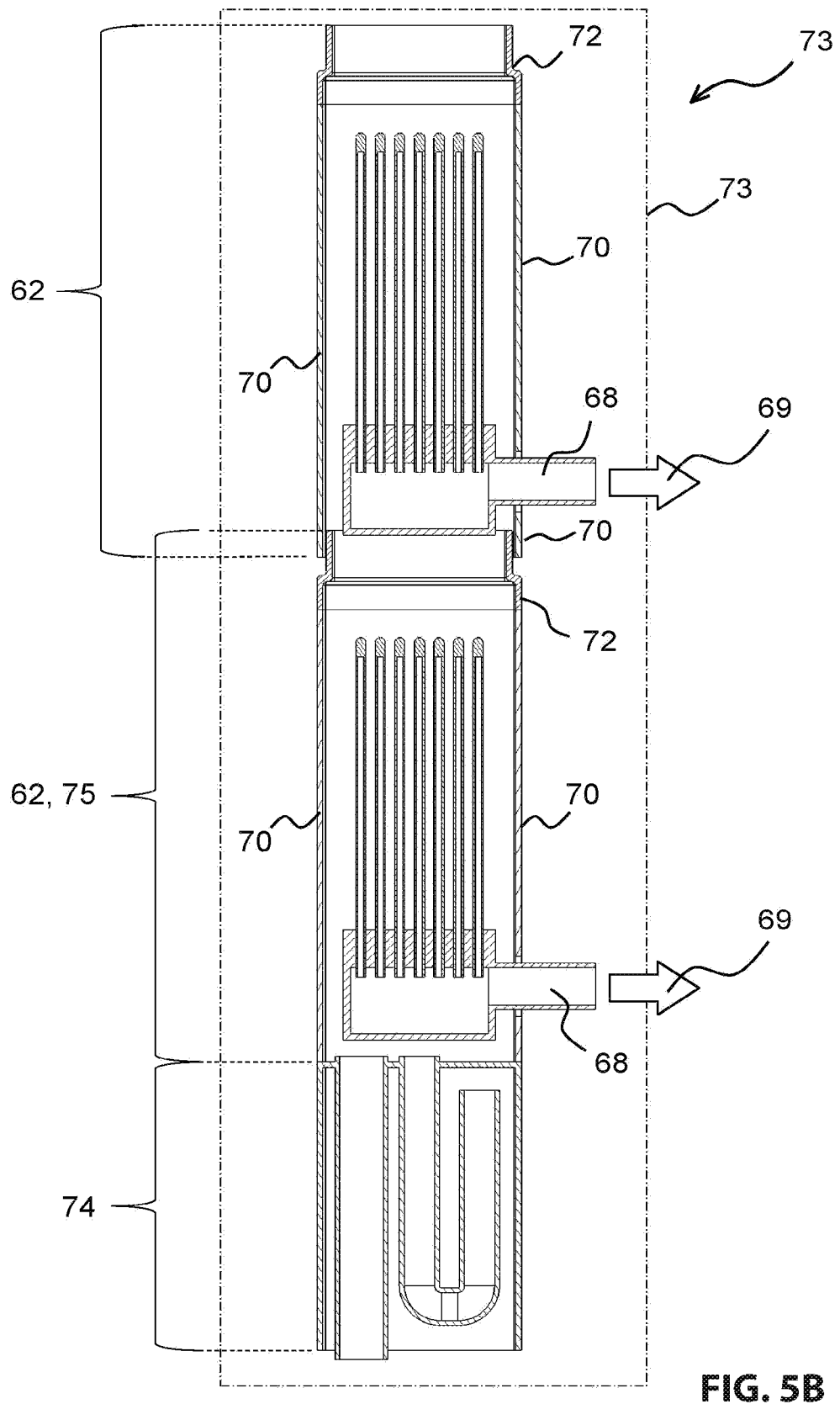

FIG. 5B shows a sectional view through a membrane unit 73 of the membrane filter 63 including a geyser element 74 and two membrane elements 62 arranged on top of one another there above, wherein the intermediary element 72 of the lower membrane element 62 penetrates the housing 70 of the membrane element 62 arranged there above. Thus, the housings 70 of the two membrane elements 62 arranged on top of one another adjoin one another. Furthermore, the housing 70 of the lowest membrane element 75 adjoins the geyser element 74 on top.

Figure 5C:
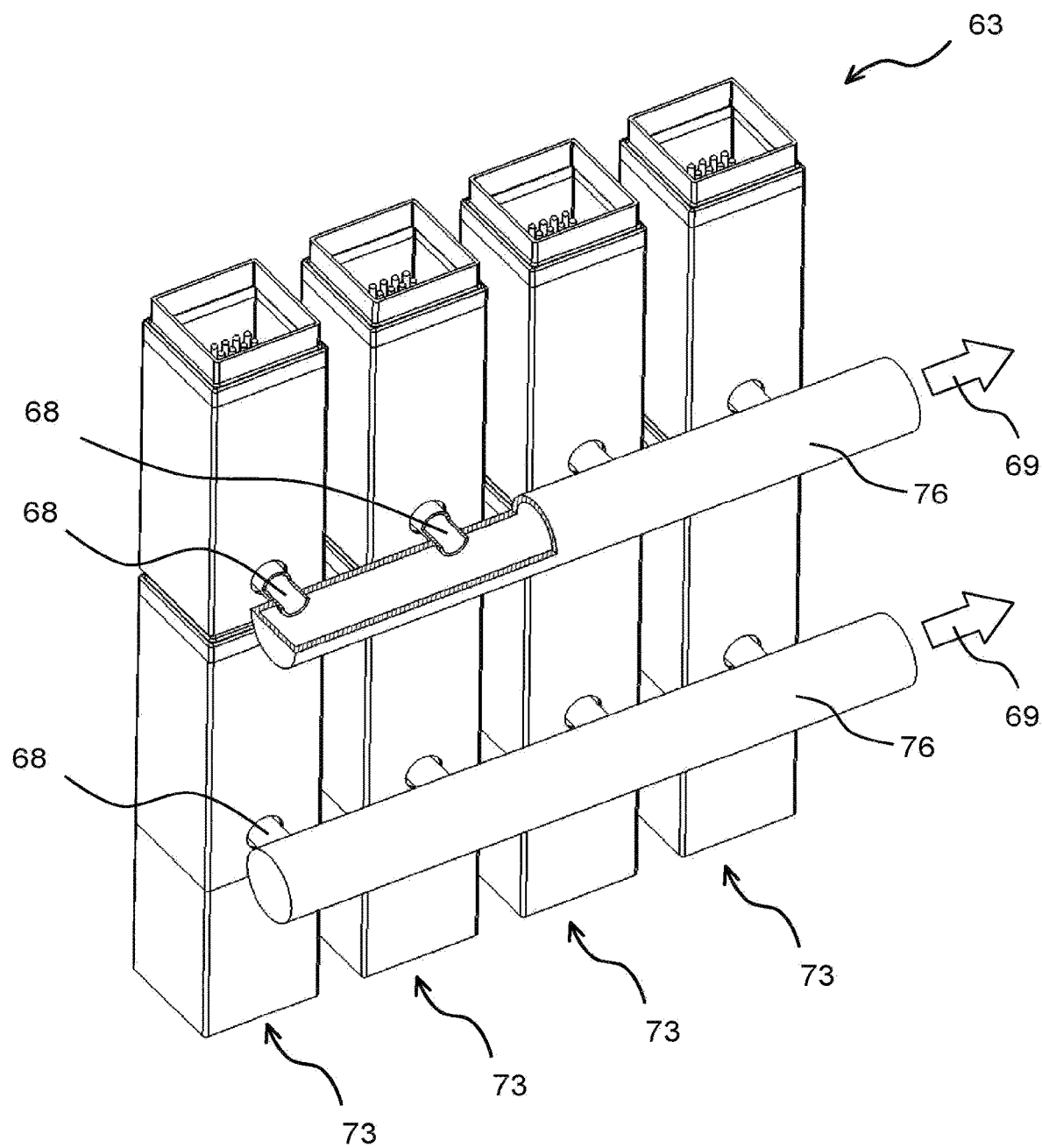

FIG. 5C shows the membrane filter 63 with four membrane units 73 arranged in parallel adjacent to one another. The permeate outlets 68 of the membrane element 62 arranged at one level are respectively connected with a common permeate collection cavity 76, where the permeate 69 can flow out as illustrated in a detail view of in FIG. 5C.

Figure 6:
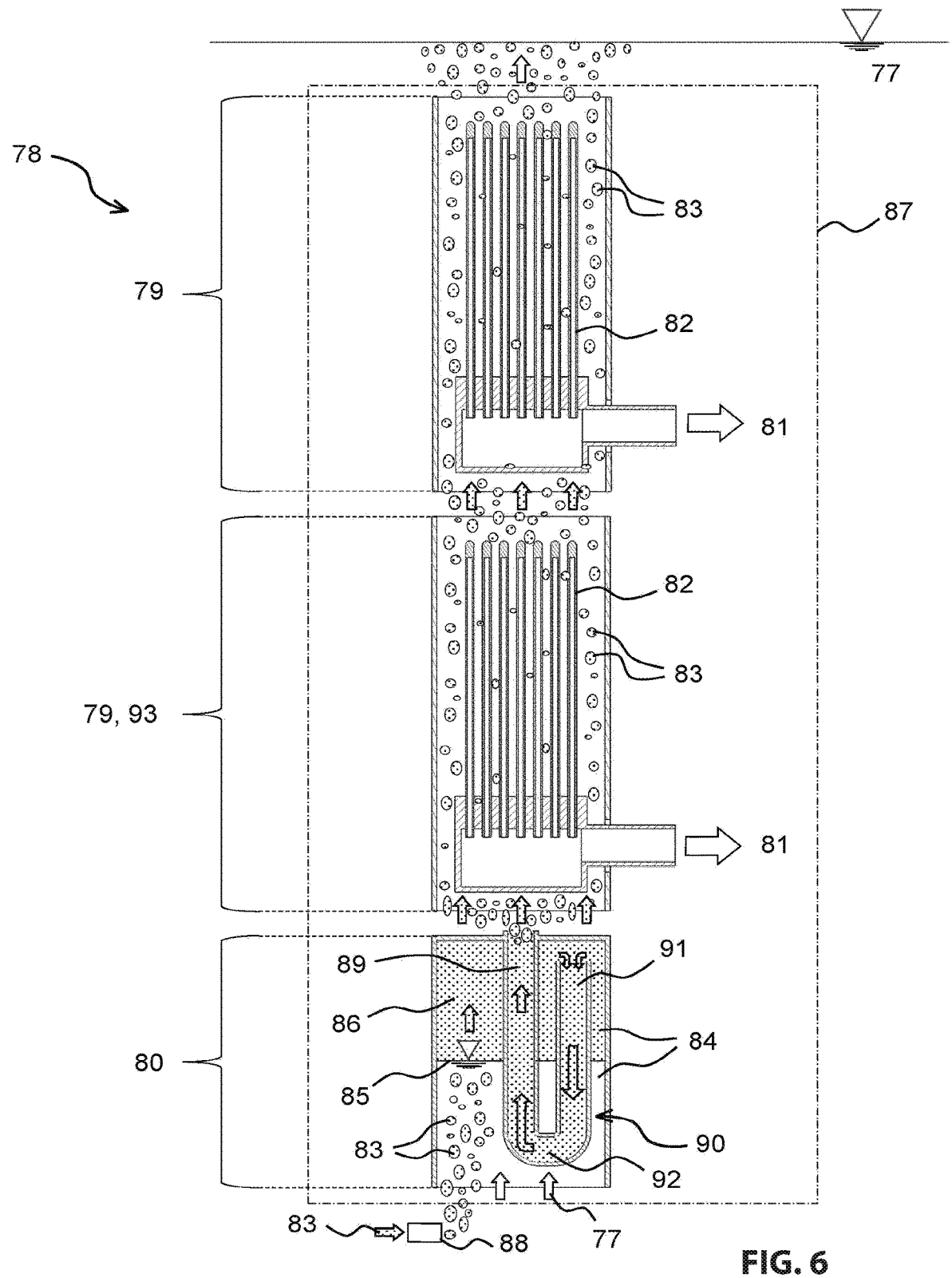
FIG. 6 illustrates a sectional view of a membrane filter according to the invention operating according to a method according to the invention.

FIG. 6 shows a first method according to the invention for filtering a liquid 77 in a membrane filter 78 including membrane elements 79 submerged in a liquid and a geyser element 80, wherein a liquid permeate 81 made from the liquid 77 is filtered through the hollow fiber membranes 52 in each of the membrane elements 79 and the hollow fiber membranes 82 are flushed by a gas 83, wherein the gas 83 is continuously let into the geyser element 80 and flows in pulses out of the geyser element 80, cyclically filling a gas volume 86 arranged in a gas collection cavity 84 of the geyser element 80 and defined in downward direction by a level 85 of the liquid 77, thus displacing the liquid 77 top down from the gas collection cavity 84 then flowing out of the gas collection cavity 84 in upward direction out of the geyser element 80 while the liquid 77 flows from below into the gas collection cavity 84 until the flow out of the gas 83 stops, wherein the gas 83 flowing out in pulses flows into one of the membrane elements 79 from below, and wherein the gas 83 flows in pulses through a membrane unit 87 in which a geyser element 80 and two membrane elements 79 are arranged on top of one another above the geyser element 80.

The gas is continuously let into the geyser element 80 through a gas inlet 88 according to the method, thus the gas collection cavity 84 is filled with gas 83 and the level 85 drops down. As soon as the level undercuts a threshold level slightly below a gas flow out channel 89 of an outlet device 90, the gas 83 flows into a gas lifting channel 91 of the outlet device 90 downward out of the gas collection cavity 84, is then deflected in a deflection portion 92 of the outlet device 90 arranged at a bottom of the gas lifting channel 91, so that the deflection is performed at an elevation of the threshold level, and then flows through the gas flow out channel 89 adjoining the deflection portion 92 on top so that the gas flows out of the geyser element 80 in upward direction. Thus, the liquid 77 flows into the gas collection cavity 84 from below until the gas flow out of the gas 83 stops and the filling process of the gas collection cavity 84 with the gas 83 starts anew. The gas 83 flowing in pulses from the geyser element 80 flows from below into the lowest membrane element 93, flows through the membrane element 93, and then flows from below into the membrane element 79 installed there above and also flows through the membrane element 79.

The filtered permeate 81 is run out of the membrane element 79 through conduits.

REFERENCE NUMERALS AND DESIGNATIONS 1 membrane element
2 membrane filter
3 base element
4 hollow fiber membrane
5 lumen
6 permeate
7 permeate collection cavity
8 permeate outlet
9 geyser element
10 gas collection cavity
11 outlet device
12 gas lifting channel
13 gas
14 deflection portion
15 gas flow out channel 16 membrane unit
17 top element
18 membrane element
19 membrane filter
20 hollow fiber membrane
21 base element
22 resin layer
23 permeate collection cavity
24 lumen
25 permeate outlet
26 housing
27 lateral wall
28 opening
29 membrane unit
30 geyser element
31 membrane element
32 membrane filter
33 hollow fiber membrane
34 base element
35 lumen
36 permeate collection cavity
37 permeate
38 permeate outlet
39 shell
40 membrane carrier
41 anchor
42 annular gap
43 housing
44 tube
45 membrane unit
46 geyser element
47 lowest membrane element
48 flow channel
49 liquid
50 gas collection cavity
51 outlet device
52 gas lifting channel
53 deflection portion
54 gas flow out channel
55 upper wall
56 membrane unit
57 membrane filter
58 geyser element
59 membrane element
60 housing
61 lowest membrane element
62 membrane element
63 membrane filter
64 hollow fiber membrane
65 base element
66 permeate collection cavity
67 lumen
68 permeate outlet
69 permeate
70 housing
71 lateral wall
72 intermediary element
73 membrane unit
74 geyser element
75 lowest membrane element
76 permeate collection conduit
77 liquid
78 membrane filter
79 membrane element
80 geyser element
81 permeate
82 hollow fiber membrane
83 gas
84 gas collection cavity
85 level, threshold level
86 gas volume
87 membrane unit
88 gas inlet
89 gas flow out channel
90 outlet device
91 gas lifting channel
92 deflection portion
93 lowest membrane element
94 module frame

What is claimed is:

1. A membrane filter configured for submerged operation for filtering a liquid, the membrane filter comprising:
  membrane elements and geyser elements for pulsating flushing of the membrane elements with a gas, each of the membrane elements including:
  hollow fiber membranes fixed in a base element of each of the membrane elements and respectively including a lumen so that a liquid permeate is filterable from the liquid into the lumen,
  a permeate collection cavity connected with the lumen of the hollow fiber membranes and configured to collect the liquid permeate from the hollow fiber membranes,
  a permeate outlet configured to drain the liquid permeate from the permeate collection cavity,
  a respective tubular housing that envelops the hollow fiber membranes of each of the membrane elements and that is penetrated by the permeate outlet,
  wherein the geyser elements are arranged below the membrane elements and each of the geyser elements includes:
  a downward open gas collection cavity, and
  an outlet device configured to let the gas out from the gas collection cavity of the geyser element through a singular opening directly into the tubular housing that envelops the hollow fiber membranes, so that the gas flows from the singular opening in upward direction in discrete sequential pulses directly into the tubular housing that envelops the hollow fiber membranes; and the membrane filter further comprising:
  membrane units respectively including one of the geyser elements and plural of the membrane elements arranged at different levels above one another and above the one of the geyser elements, so that an upper membrane element of the plural membrane elements is arranged above a lower membrane element of the plural membrane elements,
  wherein a tubular housing of the upper membrane element is flowed through in the upward direction by the gas flowing from a tubular housing of the lower membrane element,
  wherein the liquid permeate in the lumen of the hollow fiber membranes of the upper membrane element flows in a downward direction and in a direction towards the tubular housing of the lower membrane element and in an opposite direction to the gas flowing from the tubular housing of the lower membrane element into the tubular housing of the upper membrane element,
  wherein plural of the membrane units are arranged horizontally adjacent to each other and respectively include plural membrane elements respectively arranged horizontally adjacent to each other at the different levels,
  wherein permeate outlets of the plural membrane elements respectively arranged horizontally adjacent to each other at the different levels are respectively connected by a common horizontal permeate collection conduit arranged at a level outside of each respective tubular housing of each of the plural membrane elements, and wherein a second common horizontal permeate collection conduit arranged at a second level is arranged above a first common horizontal permeate collection conduit arranged at a first level wherein the first level and the second level are offset from each other along a longitudinal orientation of the hollow fiber membranes.

2. The membrane filter according to claim 1, wherein the hollow fiber membranes are individually closed on top and float freely in the liquid.

3. The membrane filter according to claim 1, wherein the base element includes a tubular shell that forms part of the tubular housing.

4. The membrane filter according to claim 1, wherein the tubular housing of a lowest membrane element of the membrane elements adjoins a geyser element of the geyser elements on top in each of the membrane units and the geyser element includes a flow channel configured to let liquid flow into the lowest membrane element.

5. The membrane filter according to claim 1, wherein tubular housings of two membrane elements arranged at different levels above one another adjoin in each of the membrane units respectively.

6. The membrane filter according to claim 1,
wherein membrane elements which are arranged below another membrane element in each of the membrane units include an intermediary element at a top of the tubular housing, and
wherein the intermediary element penetrates a bottom of a respective tubular housing of a membrane element arranged there above and compensates elevation differences within the membrane units caused by temperature induced expansion.

7. The membrane filter according to claim 1,
wherein the outlet device includes a gas lifting channel in which the gas initially flows downward from the gas collection cavity and when a threshold level of the liquid is undercut in the gas collection cavity the gas is deflected in an upward direction at an elevation of the threshold level.

8. The membrane filter according to claim 1, wherein the gas flows from the one of the geyser units into a first membrane element of the plural membrane elements and from the first membrane element into a second membrane element of the plural membrane elements, wherein the second membrane element is arranged above the first membrane element.

9. The membrane filter according to claim 1, wherein the permeate outlets of the plural membrane elements respectively arranged horizontally adjacent to each other are configured as horizontal tubular spouts arranged at one level so that axes of the tubular spouts intersect an axis of the permeate collection conduit at a right angle in a plane that is orthogonal to the upward direction and the downward direction.

10. A membrane filter configured for submerged operation for filtering a liquid, the membrane filter comprising:
membrane elements and geyser elements for pulsating flushing of the membrane elements with a gas, each of the membrane elements including:
hollow fiber membranes fixed in a base element of each of the membrane elements and respectively including a lumen so that a liquid permeate is filterable from the liquid into the lumen,
a permeate collection cavity connected with the lumen of the hollow fiber membranes and configured to collect the liquid permeate from the hollow fiber membranes,
a permeate outlet configured to drain the liquid permeate from the permeate collection cavity,
a respective tubular housing that envelops the hollow fiber membranes of each of the membrane elements and that is penetrated by the permeate outlet,
wherein the geyser elements are arranged below the membrane elements and each of the geyser elements includes:
a downward open gas collection cavity, and
an outlet device configured to let the gas out from the gas collection cavity of the geyser element through a singular opening directly into the tubular housing that envelops the hollow fiber membranes, so that the gas flows from the singular opening in upward direction in discrete sequential pulses directly into the tubular housing that envelops the hollow fiber membranes; and the membrane filter further comprising:
membrane units respectively including one of the geyser elements and plural of the membrane elements arranged at different levels above one another and above the one of the geyser elements, so that an upper membrane element of the plural membrane elements is arranged above a lower membrane element of the plural membrane elements,
wherein a tubular housing of the upper membrane element is flowed through in the upward direction by the gas flowing from a tubular housing of the lower membrane element,
wherein the liquid permeate in the lumen of the hollow fiber membranes of the upper membrane element flows in a downward direction and in a direction towards the tubular housing of the lower membrane element and in an opposite direction to the gas flowing from the tubular housing of the lower membrane element into the tubular housing of the upper membrane element,
wherein plural of the membrane units are arranged horizontally adjacent to each other and respectively include plural membrane elements respectively arranged horizontally adjacent to each other at the different levels.

11. A method for filtering a liquid in the membrane filter according to claim 1 submerged in the liquid and including the membrane elements and the geyser elements, the method comprising:
filtering a liquid permeate in each of the membrane elements from the liquid into the lumens of hollow fiber membranes that are attached at the base element;
collecting the liquid permeate from the lumens in the permeate collection cavity;
draining the liquid permeate through the tubular housing from the permeate collection cavity;
flushing the hollow fiber membranes by the gas; and
continuously letting the gas into each of the geyser elements and letting the gas flow in pulses out of each of the geyser elements, by cyclically filling a gas volume arranged in the gas collection cavity of each of the geyser elements, wherein the gas volume is defined in downward direction by a level of the liquid and simultaneously displacing the liquid top down from the gas collection cavity,
and thereafter running the gas from the gas collection cavity upward out of each of the geyser elements, while running the liquid into the gas collection cavity from below until an outflow of the gas stops, wherein the gas flowing out in pulses flows from below into one of the membrane elements, and wherein the gas flows through the membrane units in pulses.

* * * * *